United States Patent
Liang et al.

(10) Patent No.: US 9,415,760 B2
(45) Date of Patent: Aug. 16, 2016

(54) CLUTCH CALIBRATION FOR A HYBRID ELECTRIC POWERTRAIN

(71) Applicant: FORD GLOBAL TECHNOLOGIES, LLC, Dearborn, MI (US)

(72) Inventors: Wei Liang, Farmington Hills, MI (US); Daniel S. Colvin, Farmington Hills, MI (US); Rajit Johri, Ann Arbor, MI (US); Ryan A. McGee, Ann Arbor, MI (US); Xiaoyong Wang, Novi, MI (US); Bernard D. Nefcy, Novi, MI (US); Mark S. Yamazaki, Canton, MI (US); Ming L. Kuang, Canton, MI (US); Marvin P. Kraska, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 240 days.

(21) Appl. No.: 14/243,194

(22) Filed: Apr. 2, 2014

(65) Prior Publication Data

US 2015/0283989 A1     Oct. 8, 2015

(51) Int. Cl.
*B60W 10/02* (2006.01)
*B60W 10/06* (2006.01)
*B60W 10/08* (2006.01)

(52) U.S. Cl.
CPC .............. *B60W 10/02* (2013.01); *B60W 10/06* (2013.01); *B60W 10/08* (2013.01); *B60W 2510/06* (2013.01); *B60W 2510/08* (2013.01); *B60W 2710/02* (2013.01); *Y10T 477/26* (2015.01)

(58) Field of Classification Search
None
See application file for complete search history.

(56) References Cited

U.S. PATENT DOCUMENTS

| | | | |
|---|---|---|---|
| 7,730,982 B2 | 6/2010 | Hidaka | |
| 7,758,467 B2 | 7/2010 | Ashizawa | |
| 8,282,527 B2 | 10/2012 | Suzuki | |
| 2008/0194384 A1* | 8/2008 | League | F16H 61/061 477/130 |
| 2013/0066530 A1 | 3/2013 | Holzer | |

FOREIGN PATENT DOCUMENTS

| | | |
|---|---|---|
| EP | 2014946 A2 | 1/2009 |
| WO | 2012128065 A1 | 9/2012 |

* cited by examiner

*Primary Examiner* — Justin Holmes
(74) *Attorney, Agent, or Firm* — David B. Kelley; MacMillan, Sobanski & Todd, LLC

(57) ABSTRACT

Calibration of an engine disconnect clutch for a hybrid electric powertrain. The clutch is prestroked while an engine and machine are stopped. A machine torque is increased until the machine starts rotating. A pressure of the clutch is adjusted as a function of a torque produced by the machine when the machine started rotating.

19 Claims, 2 Drawing Sheets

CLUTCH CALIBRATION FOR A HYBRID ELECTRIC POWERTRAIN

BACKGROUND OF INVENTION

The present invention relates to a method of controlling a hybrid electric automotive powertrain and in particular to a method of calibrating a clutch of the automotive powertrain.

A powertrain of an automotive vehicle may include a disconnect clutch between an internal combustion engine and other powertrain components. Typically, the clutch is pressure controlled. The clutch may be placed in a prestroked state. In the prestroked state, a stroke pressure places clutch plates close to contact without transmitting torque. When in the prestroked state, a small pressure increase from the stroke pressure will begin transmitting torque between the plates. By prestroking the clutch, the clutch may be more quickly placed in an engaged torque transmitting state.

The clutch may be calibrated to set the stroke pressure. If the stroke pressure is too high, the clutch will be overstroked. An overstroked clutch creates a drag force on the powertrain. The drag force reduces powertrain efficiency and increases wear on the clutch. When the clutch is overstroked, the clutch plates are brought too tightly together in the prestroked state and torque is transmitted prior to torque transmission being desired.

Some methods of calibrating the clutch use direct monitoring of the clutch, often via sensors that are otherwise not required. Other calibration methods commonly result in the clutch being overstroked, which may produce noise, vibration, and harshness that is objectionable to an occupant of the vehicle.

SUMMARY OF INVENTION

An embodiment contemplates a method of calibrating an engine disconnect clutch in a vehicle including: increasing torque of a stopped electric traction machine connected to the clutch when a powertrain is not propelling the vehicle; and adjusting the clutch as a function of a magnitude of torque when the stopped machine initially starts rotating.

An advantage of an embodiment is that the clutch is calibrated without noise, vibration, or harshness that intrudes upon a vehicle occupant. This may improve driveability of the vehicle. Additionally, the clutch may be calibrated without the need for a sensor directly monitoring clutch position, which may reduce costs and improve packaging of clutch components.

DETAILED DESCRIPTION

Figure 1:
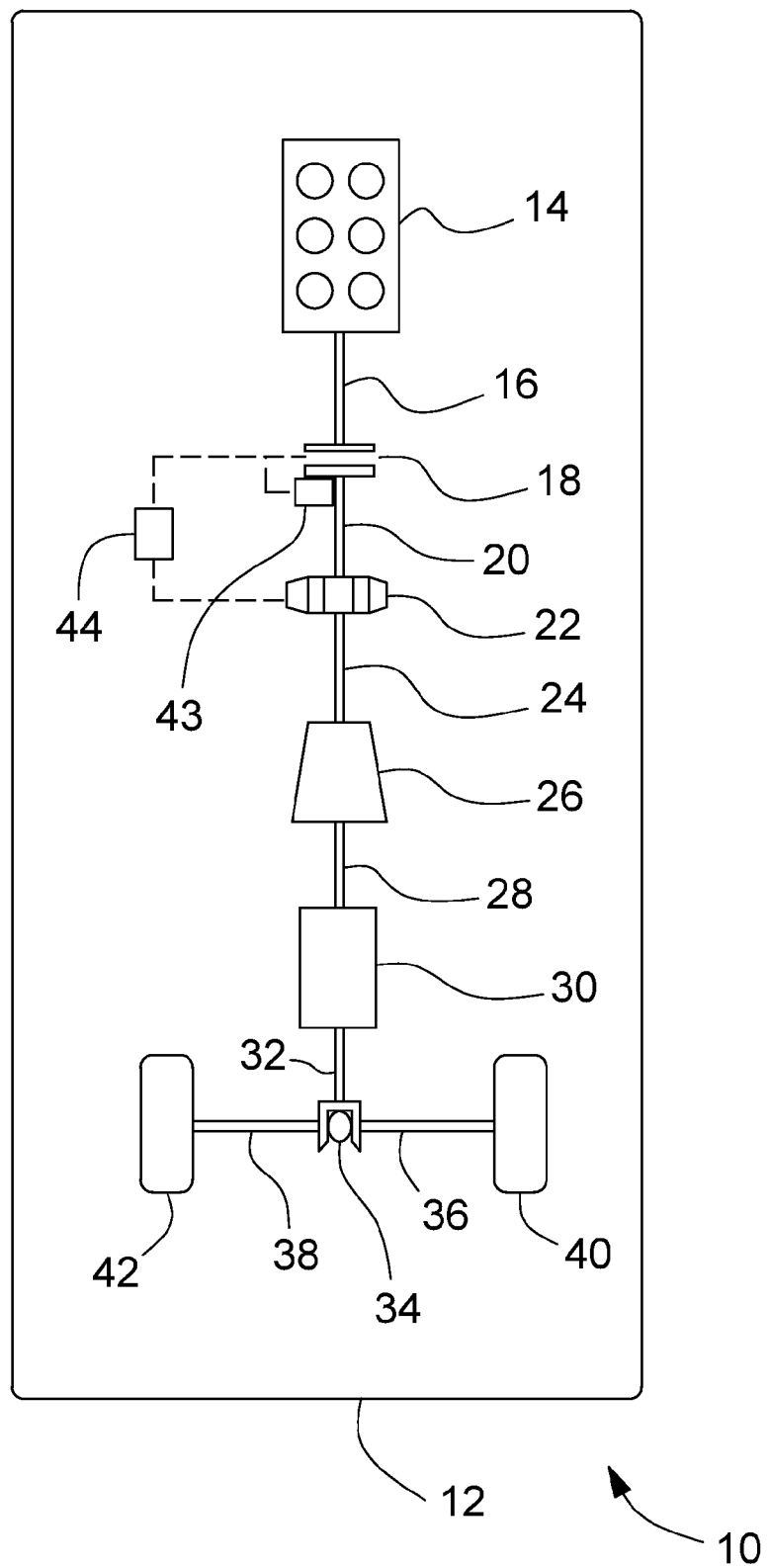
FIG. 1 is a schematic view of a hybrid electric powertrain.

FIG. 1 schematically illustrates a hybrid electric powertrain 10 for an automotive vehicle 12. This powertrain 10 is merely exemplary, and may take other forms, which may be front wheel drive, rear wheel drive, or all wheel drive types of powertrains. As described, the powertrain 10 is a parallel type hybrid electric powertrain but may also be another type of powertrain known to one skilled in the art such as a series or powersplit type hybrid electric powertrain.

The powertrain 10 includes an internal combustion engine 14 powering a crankshaft 16. Interposed between the engine 14 and an electric machine 22, which may be an electric motor or motor/generator, is an engine disconnect clutch 18. When engaged, the clutch 18 connects the crankshaft 16 with an electric machine input 20 and transmits torque between the engine 14 and the machine 22. In turn, the machine 22 transmits torque to a torque converter 26 through a torque converter input 24 and the torque converter 26 transmits torque to a transmission 30 through a transmission input 28. The transmission 30 turns a driveshaft 32 which in turn drives a differential 34. The differential 34 transmits torque to first and second axles 36 and 38, respectively, which drive first and second wheels 40 and 42, respectively. A controller 44 manages operation of the powertrain 10, including the clutch 18 and the machine 22.

As discussed, the clutch 18 is a pressure controlled clutch, but other types of clutches known to those skilled in the art may be used. The clutch 18 is actuated by changing a pressure of a hydraulic fluid in a hydraulic system 43. Increasing the fluid pressure engages clutch plates of the clutch 18 to transmit torque. Decreasing the fluid pressure disengages and keeps separate the clutch plates. Hydraulic systems 43 for actuating clutches are known to those skilled in the art and so will not be discussed in more detail herein.

Figure 2:
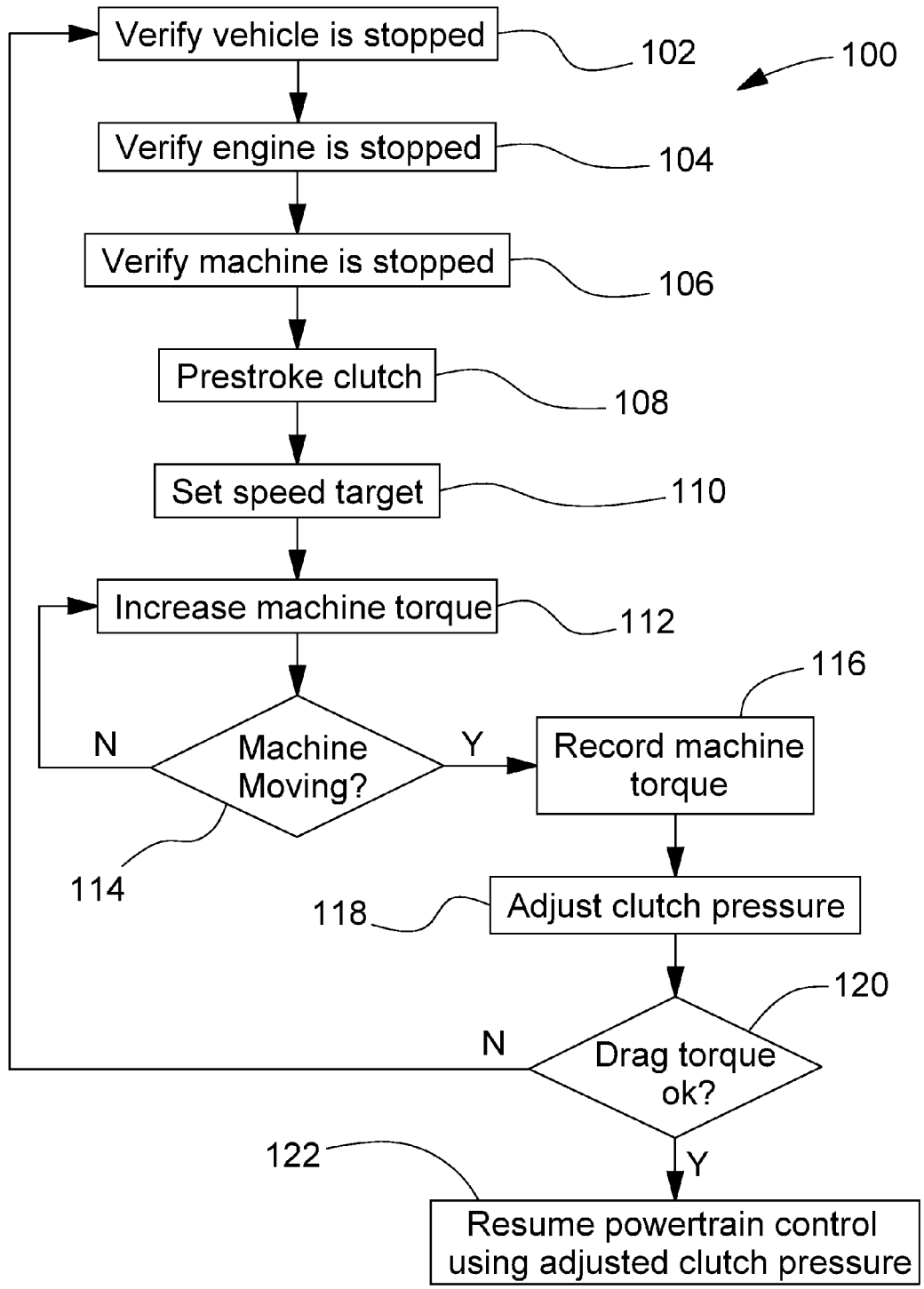
FIG. 2 is a flow chart of a calibration routine for an engine disconnect clutch.

FIG. 2 will now be discussed with reference to FIG. 1. FIG. 2 illustrates a calibration routine 100 for the engine disconnect clutch 18.

In a step 102, the controller 44 verifies that the vehicle 12 is stopped. The controller 44 may verify that the vehicle 12 is stopped by determining that brakes are holding the vehicle 12 or that a transmission gear position is park or neutral. The controller 44 verifies that the engine 14 is stopped in a step 104 and that the machine 22 is stopped in a step 106.

In a step 108, the controller 44 places the clutch 18 in an initial prestroked state by applying an initial stroke pressure to the clutch 18. The clutch 18 is in a prestroked state when the plates of the clutch 18 are moved closer together than without any application of pressure and so are close to contact but not transmitting torque.

In a step 110, the controller 44 sets a speed target for the machine 22. The speed target is a low machine speed. The low machine speed target allows the calibration routine 100 to be carried out such that noise, vibration, or harshness does not intrude upon an occupant of the vehicle 12 during the routine 100. For example, the speed target may be 20 RPM. In a step 112, the controller 44 increases torque produced by the machine 22.

The controller 44, in a step 114, determines if the machine 22 started moving after torque produced by the machine was increased in the step 112. If the machine 22 has not started moving, then the calibration routine 100 returns to the step 112 where the torque produced by the machine 22 is increased again. If the machine 22 has started moving, then, in a step 116, the controller 44 records the torque produced by the machine 22 in the step 112 as a drag force at the initial stroke pressure.

In a step 118, after the drag force is recorded, the controller 44 adjusts the initial stroke pressure. The initial stroke pressure is adjusted to minimize clearance between the clutch plates while still preventing torque transmission. Preventing torque transmission reduces drag on the machine 22 from the clutch 18 and/or the engine 14 via the clutch 18. When the drag force is too large, the controller 44 reduces the initial stroke pressure. Alternatively, when the drag force is zero, the controller 44 increases the initial stroke pressure. The increased or decreased stroke pressure is recorded as an adjusted stroke pressure.

In a step 120, the controller 44 evaluates the drag force. If the drag force is acceptable, then in a step 122, the controller 44 resumes normal operation of the powertrain 10 using the adjusted stroke pressure for the clutch 18. For example, the adjusted stroke pressure may be used to place the clutch 18 in a prestroked state when the engine 14 is started or when the machine 22 propels the vehicle 22 with the engine 14 stopped.

Otherwise, if the drag force is unacceptable, the calibration routine 100 returns to the step 102 using the adjusted stroke pressure as the initial stroke pressure. Whether the drag force is acceptable is a function of a desired efficiency of the machine 22 and/or the powertrain 10.

The calibration routine 100 is repeatable at every stop of the vehicle 12. Repeating the calibration routine 100 will account for variances such as wear on the clutch 18. However, if stroke pressures are determined by the calibration routine 100 are sufficiently consistent, then the frequency of the routine 100 may be decreased.

While certain embodiments of the present invention have been described in detail, those familiar with the art to which this invention relates will recognize various alternative designs and embodiments for practicing the invention as defined by the following claims.

The invention claimed is:

1. A method of calibrating an engine disconnect clutch in a vehicle comprising:
    after prestroking the clutch, increasing torque of a stopped electric traction machine connected to the clutch while an engine and the vehicle are stopped;
    correcting prestroke clutch movement as a function of a magnitude of torque when the stopped machine initially starts rotating.

2. The method of claim 1 wherein the clutch movement is corrected by changing a clutch pressure.

3. The method of claim 2 wherein, when the recorded magnitude of torque is zero, the prestroke clutch pressure is increased.

4. The method of claim 2 wherein, when the recorded magnitude of torque is greater than zero, the prestroke clutch pressure is decreased.

5. The method of claim 2 wherein the changed clutch pressure is used when the engine is started.

6. The method of claim 2 wherein the changed clutch pressure is used when the machine propels the vehicle with the engine stopped.

7. The method of claim 2 wherein changing the prestroke clutch pressure includes changing a hydraulic pressure applied to the clutch to actuate the clutch.

8. The method of claim 1 wherein the clutch is adjusted to minimize drag on the machine from the clutch when the clutch is not fully disengaged between the machine and the stopped engine while the machine is rotating.

9. The method of claim 1 wherein the clutch movement is corrected to minimize clearance between clutch plates of the clutch while not transmitting torque between the clutch plates.

10. The method of claim 1 further including, providing the clutch connected between an output of the engine and an input of the machine, and an output of the machine driving a transmission input, such that disengaging the clutch prevents the engine from driving the transmission input.

11. A method of calibrating an engine disconnect clutch in a vehicle comprising:
    after prestroking the clutch, increasing torque of a stopped electric traction machine connected to the clutch when a powertrain is not propelling the vehicle;
    correcting the prestroke clutch movement, by changing a clutch pressure, as a function of a magnitude of torque when the stopped machine initially starts rotating, wherein when the magnitude of torque is zero, the prestroke clutch pressure is increased and when the magnitude of torque is greater than zero, the prestroke clutch pressure is decreased.

12. The method of claim 11 wherein the changed clutch pressure is used when an engine is started.

13. The method of claim 11 wherein the changed clutch pressure is used when the machine propels the vehicle with an engine stopped.

14. The method of claim 11 wherein changing the clutch pressure includes changing a hydraulic pressure applied to the clutch to actuate the clutch.

15. The method of claim 11 wherein the clutch is adjusted to minimize drag on the machine from the clutch when the clutch is not fully disengaged between the machine and a stopped engine while the machine is rotating.

16. The method of claim 11 wherein the clutch movement is corrected to minimize clearance between clutch plates of the clutch while not transmitting torque between the clutch plates.

17. The method of claim 11 further including, providing the clutch connected between an output of an engine and an input of the machine, and an output of the machine driving a transmission input, such that disengaging the clutch prevents the engine from driving the transmission input.

18. A method of calibrating an engine disconnect clutch in a vehicle, comprising:
    while the vehicle, an engine and an electric machine are stopped, prestroking the clutch, and then incrementally increasing machine torque until the machine begins to rotate;
    correcting the prestroke clutch pressure based on the machine torque at which the machine began to rotate.

19. The method of claim 18 further including, providing the clutch connected between an output of the engine and an input of the machine, and an output of the machine driving a transmission input, such that disengaging the clutch prevents the engine from driving the transmission input.

* * * * *